USOO6116789A

United States Patent [19]
Mrakovich et al.

[11] Patent Number: 6,116,789
[45] Date of Patent: Sep. 12, 2000

[54] COUPLING ASSEMBLY FOR COUPLING GLASS OPTICAL FIBER LEADS TO PLASTIC OPTICAL FIBER LEADS OF A HYBRID FIBER OPTIC LIGHTING DISTRIBUTION SYSTEM

[75] Inventors: Matthew S Mrakovich, Canfield; John V Denuto, Warren, both of Ohio

[73] Assignee: Delphi Technologies, Inc., Troy, Mich.

[21] Appl. No.: 09/190,997

[22] Filed: Nov. 12, 1998

[51] Int. Cl.[7] ........................................................ G02B 6/38
[52] U.S. Cl. .............................. 385/59; 385/60; 385/55; 385/72; 385/77; 385/78; 385/139
[58] Field of Search .................................. 385/52, 53, 55, 385/56, 58, 59, 60, 72, 139, 77, 78

[56] References Cited

U.S. PATENT DOCUMENTS

| | | | |
|---|---|---|---|
| 4,140,367 | 2/1979 | Makuch ................................. | 385/59 X |
| 4,789,218 | 12/1988 | Paul et al. .............................. | 385/59 X |
| 5,367,595 | 11/1994 | Jennings et al. .......................... | 385/71 |
| 5,542,015 | 7/1996 | Hultermans ............................. | 385/60 |
| 5,555,332 | 9/1996 | Dean et al. .............................. | 385/53 |
| 5,633,969 | 5/1997 | Jennings et al. .......................... | 385/62 |
| 5,692,080 | 11/1997 | Lu .............................................. | 385/60 |
| 5,923,805 | 7/1999 | Anderson et al. ........................ | 385/86 |

*Primary Examiner*—Brian Healy
*Attorney, Agent, or Firm*—Richard A. Jones

[57] ABSTRACT

A coupling assembly for a hybrid fiber optic lighting distribution system including a first coupling member having first cavities for individually receiving first ferrules of glass optical fiber (GOF) leads, a slidably intermitting second coupling member having second cavities for individually receiving second ferrules of plastic optical fiber (POF) leads, and an alignment body which is interfaced between the first and second coupling members so that mating cavities thereof are each respectively aligned with respective pairs of aligned first and second cavities for providing a precisely aligned optical interface between the GOF downstream face of the GOF leads and the POF upstream face of the POF leads. The coupling member further includes a ferrule position assurance member which is affixed to the rear of the second coupling member so as to compress cylindrical springs associated with each second ferrule, whereupon the POF upstream faces are caused to biasably abut the GOF downstream faces.

19 Claims, 5 Drawing Sheets

COUPLING ASSEMBLY FOR COUPLING GLASS OPTICAL FIBER LEADS TO PLASTIC OPTICAL FIBER LEADS OF A HYBRID FIBER OPTIC LIGHTING DISTRIBUTION SYSTEM

TECHNICAL FIELD

The present invention relates to fiber optic systems, and more particularly to a lighting distribution system which is a hybrid of dual optical fiber media. Still more particularly, the present invention relates to a coupling assembly for coupling a plurality of glass optical fiber leads to individually respective plastic optical fiber leads.

BACKGROUND OF THE INVENTION

As motor vehicles become increasingly sophisticated, there is an attendant need for distributed lighting to a variety of locations of the motor vehicle. While discrete conventional light sources, such as incandescent bulbs, may be placed wherever lighting is desired, there are distinct disadvantages to this mode of lighting. For example, each illumination location (illumination feature) requires a separate bulb and bulb fixture, as well as a separate power lead. These requirements of discrete conventional light sources are undesirably complex and costly, and involve excessive maintenance and increased vehicular weight.

It would, therefore, be a major benefit if a fiber optic distributed lighting system could be used in place of a multiplicity of discrete light sources. However, fiber optic distributed lighting has the draw back that a source of light having sufficient brilliance to adequately illuminate a number of illumination features would require high temperature tolerant fiber optic media. Unfortunately, although available, such fiber optic media are prohibitively expensive to use throughout the fiber optic lighting distribution system.

Accordingly, what is needed in the art is a fiber optic lighting distribution system which is high temperature tolerant only where required, is inexpensive and easily maintained. More particularly, what remains needed is provision for coupling glass optical fiber leads to individually respective plastic optical fiber leads.

SUMMARY OF THE INVENTION

The present invention is a coupling assembly for optically interfacing a plurality of glass optical fiber (GOF) leads to individually respective plastic optical fiber (POF) leads of a hybrid fiber optic distribution system, wherein the coupling assembly is located, via the GOF leads, a predetermined distance from a fiber optic light source module at which distance the heat therefrom is low enough for the POF leads to be tolerant.

The coupling assembly includes a first coupling member having first cavities for individually receiving first ferrules of the GOF leads, a slidably intermitting second coupling member having second cavities for individually receiving second ferrules of the POF leads, and an alignment body which is interfaced between the first and second coupling members so that mating cavities thereof are each respectively aligned with respective pairs of aligned first and second cavities for providing a precisely aligned optical interface between the GOF downstream face of the GOF leads and the POF upstream face of the POF leads.

Each of the first cavities of the first coupling member includes a resilient first lock arm. Each first lock arm is disposed into a respective first cavity and resiliently engages a lock rim of the first ferrule received therein. The inner surface of the first coupling member includes a pair of axially oriented guide posts for guidably interfacing with corresponding guide holes on a first side of the alignment body. The first side of the alignment body further has positive lock reinforcement (PLR) fingers for being respectively received between each pair opposing lock arms when the alignment body is interfaced with the first coupling member.

Each of the second cavities of the second coupling member includes a resilient second lock arm. Each second lock arm is disposed into a respective second cavity and resiliently engages a lock ring of the second ferrule received therein. The inner surface of the second coupling member further includes a pair of axially oriented alignment rails for guidably interfacing with corresponding alignment slots communicating with a second side of the alignment body.

A second ferrule position assurance (second FPA) member has lead slots for receiving each respective POF lead and is lockably affixed to the rear of the second coupling member, thereby compressing cylindrical springs associated with each second ferrule.

In operation, the first side of the alignment body is brought toward the inner surface of the first coupling member and locked thereto at a first stage. The first ferrules are then received into individually respective first cavities of the first coupling member and mating cavities of the alignment body so that the first lock arms engage the lock rims thereof. The alignment body is then locked to the first coupling member at a second stage whereupon the PLR fingers lock the first lock arms in place.

The second ferrules are received into individually respective second cavities of the second coupling member so that the second lock arms engage the lock rings thereof, whereupon the second ferrules are trapped in the second cavities by a secondary abutment. The lead slots of the second FPA member receive each respective POF lead and the second FPA member is lockably affixed to the rear of the second coupling member, thereby compressing cylindrical springs associated with each second ferrule. Next, the first and second coupling members are locked together, whereupon the second ferrules enter into respective mating cavities and each first ferrule is aligned with a respective second ferrule and the springs bias the POF upstream faces into aligned abutment with individually respective GOF downstream faces.

From the foregoing, it should be understood that the coupling assembly according to the present invention has a number of benefits, including:

alignment of different types and diameters of optical fibers;

fewer pieces than conventional fiber optic connection devices;

integration of functions into common components;

utilization of a push-click-tug assembly method for both the GOF leads and the POF leads;

superior alignment of mating components; and reduction of tolerance stacks due to elimination of large surfaces coming into contact.

Accordingly, it is an object of the present invention to provide a coupling assembly for connecting a plurality of GOF leads with a plurality of POF leads, wherein each GOF lead is optically interfaced with a respective POF lead.

It is an additional object of the present invention to provide a coupling assembly for connecting a plurality of GOF ferrules to a plurality of POF ferrules via an alignment body interfaced with interlocking first and second coupling members.

These, and additional objects, advantages, features and benefits of the present invention will become apparent from the following specification.

DESCRIPTION OF THE PREFERRED EMBODIMENT

Figure 1:
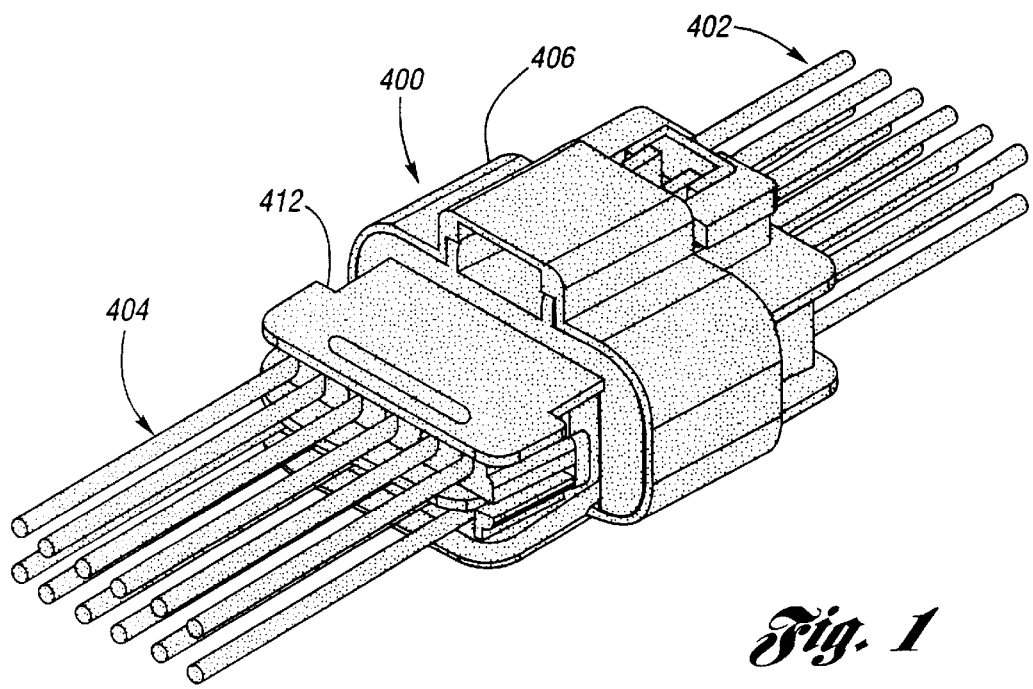
FIG. 1 is a perspective view of the coupling assembly according to the present invention, shown in operation optically interfacing a plurality of glass optical fiber leads to a plurality of plastic optical fiber leads.
Figure 2:
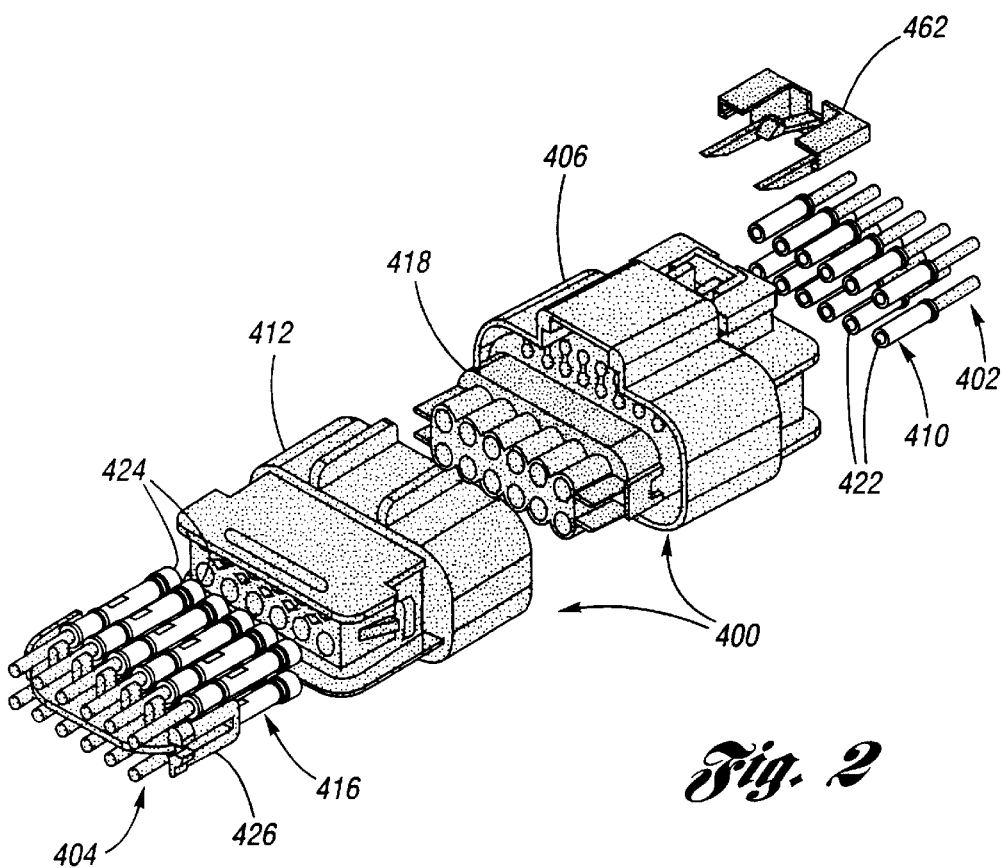
FIG. 2 is an exploded perspective view of the coupling assembly as operationally shown in FIG. 1.

Referring now to the Drawing, FIGS. 1 and 2 show the coupling assembly 400 according to the present invention in operation with respect to optically interfacing a plurality of glass optical fiber (GOF) leads 402 to individually respective plastic optical fiber (POF) leads 404 of a hybrid fiber optic distribution system, wherein the coupling assembly is located, via the GOF leads, a predetermined distance from a fiber optic light source module at which distance the heat therefrom is low enough for the POF leads to be tolerant.

Figure 3:
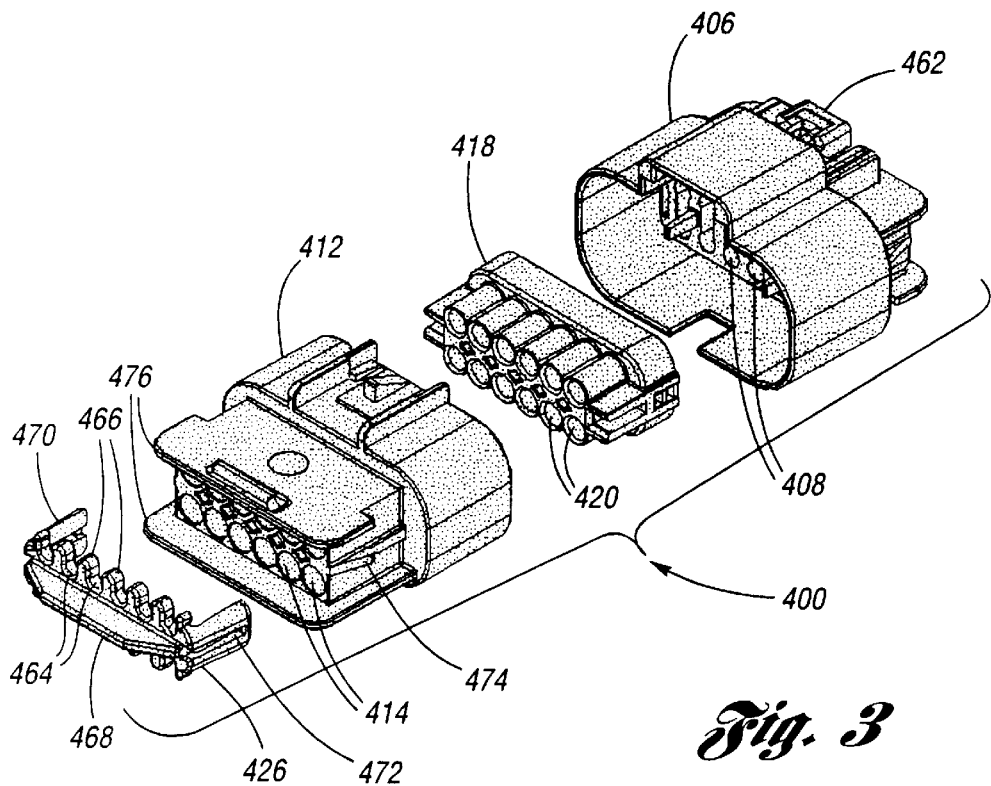
FIG. 3 is an exploded view of the coupling assembly.

Referring now additionally to FIG. 3, the coupling assembly 400 includes a first coupling member 406 having first cavities 408 for individually receiving first ferrules 410 of the GOF leads 402, a slidably interfitting second coupling member 412 having second cavities 414 for individually receiving second ferrules 416 of the POF leads 404, an alignment body 418 which is interfaced with the first and second coupling members whereby mating cavities 420 thereof are aligned with the first and second cavities 408, 414 for providing a precisely aligned optical interface between the GOF downstream face 422 of the GOF leads and the POF upstream face 424 of the POF leads, and a second ferrule position assurance (second FPA) member 426.

Figure 7:
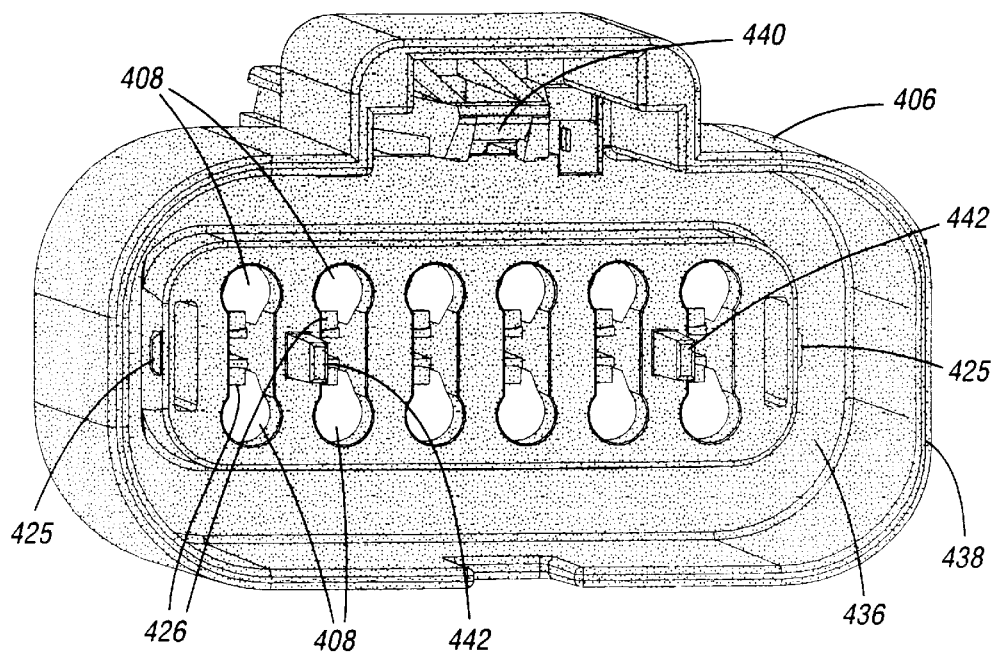
FIG. 7 is a perspective view of the first coupling member according to the present invention.
Figure 8:
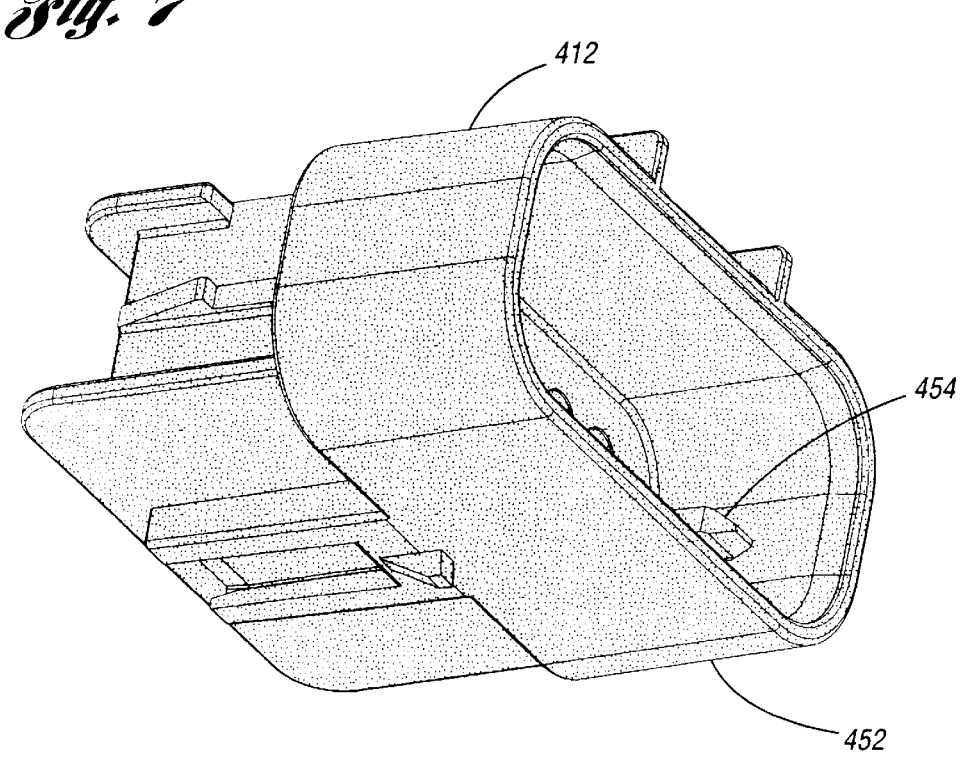
FIG. 8 is a perspective view of the second coupling member according to the present invention.
Figure 9:
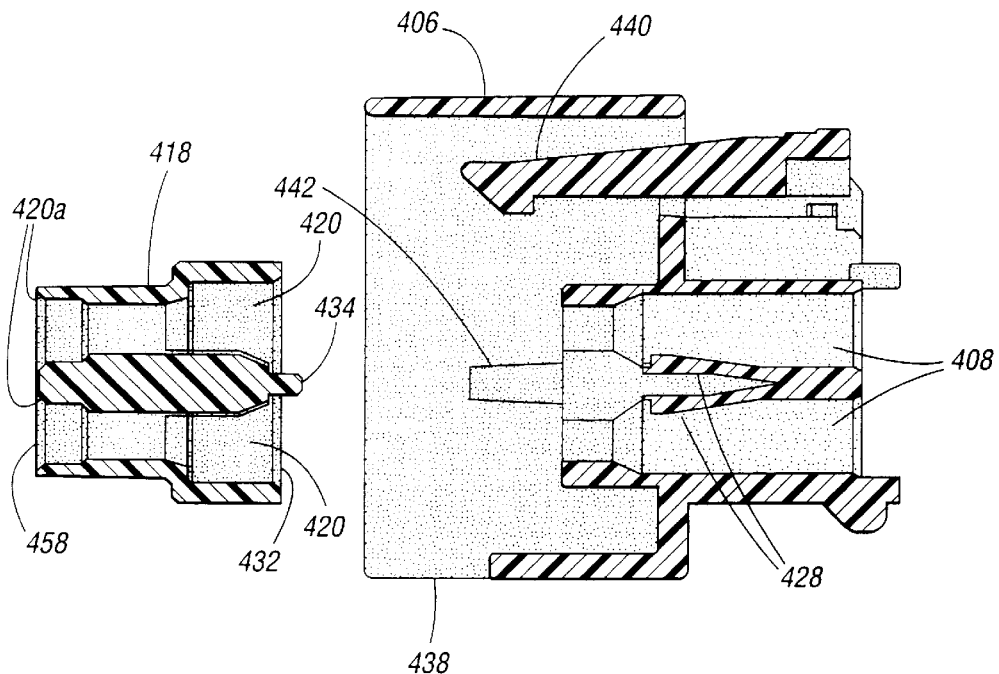
FIG. 9 is a partly sectional side view of a first coupling member and the alignment body according to the present invention.
Figure 10:
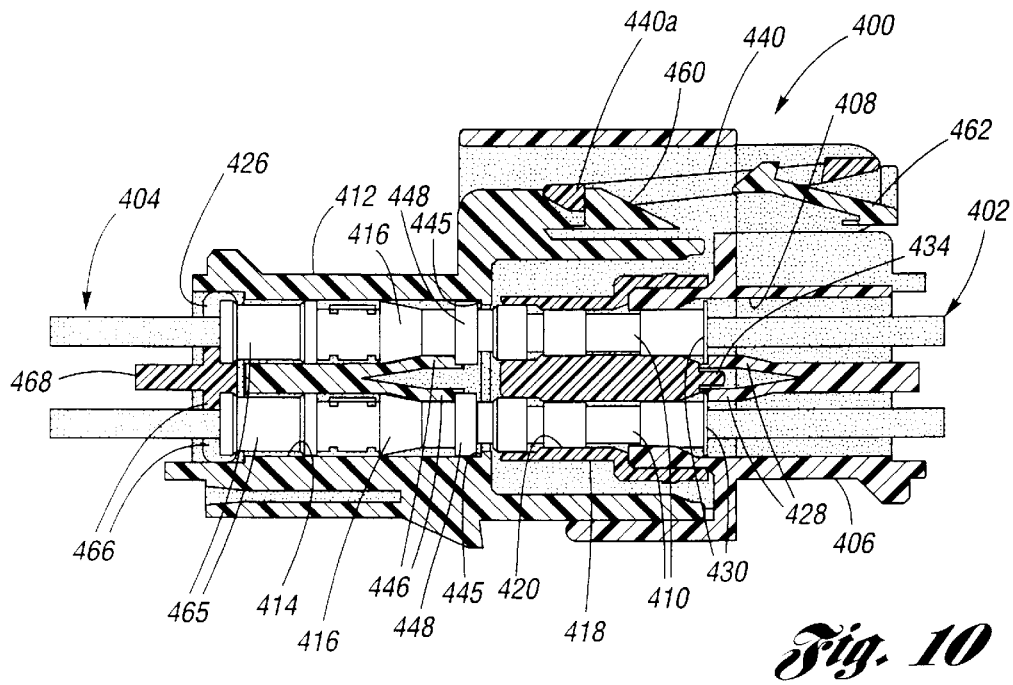
FIG. 10 is a partly sectional side view of the coupling assembly, shown in operation.

Referring now to the first coupling member 406, shown best at FIGS. 7, 9 and 10, each of the first cavities 408 includes a resilient first lock arm 428. Each first lock arm 428 is disposed into a respective first cavity 408 and resiliently engages a lock rim 430 of the first ferrule 410 received therein so as to abuttably prevent the first ferrule from backing out from the first cavity.

Figure 5:
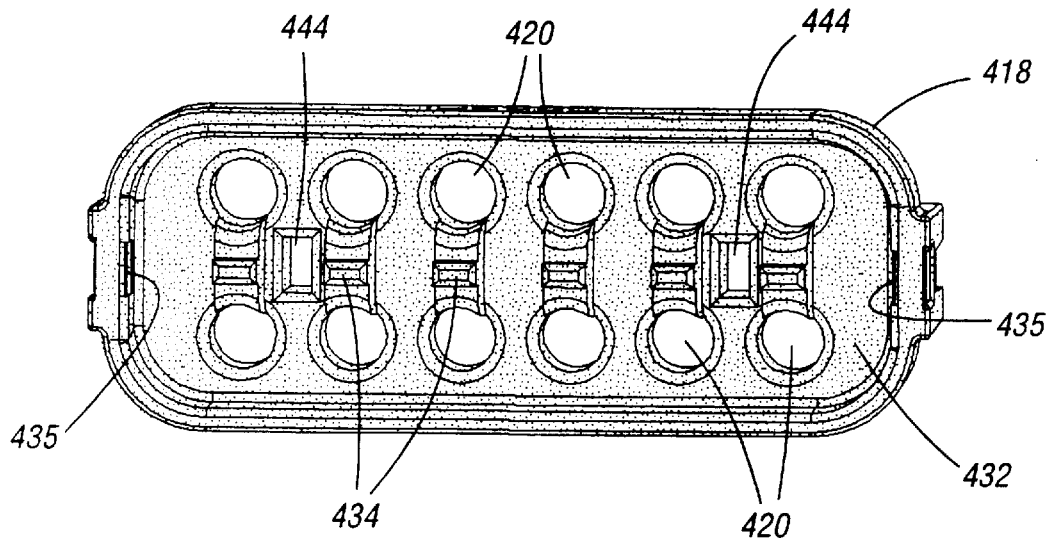
FIG. 5 is a front end view of the alignment body according to the present invention.

As shown best at FIGS. 5, 9 and 10, a first side 432 of the alignment body 418 has a plurality of positive lock reinforcement (PLR) fingers 434, wherein each is respectively received between a pair of opposing lock arms when the alignment body is interfaced with the first coupling member.

As shown at FIGS. 7 and 9, an inner surface 436 of the first coupling member 406 is recessed with respect to a first shroud 438, wherein an upper location of which carries a resilient main lock arm 440. A pair of axially oriented guide posts 442 project from the inner surface 436 for guidably interfacing with corresponding guide holes 444 on the first side 432 of the alignment body 418. As shown best at FIGS. 5 and 7, a pair of protuberances 425 adjacent the inner surface 436 of the first coupling member snappingly interact with a two-stage clip member 435 on either side of the alignment body 418 for providing connection therebetween at two staged positions.

Referring now to the second coupling member 412, shown best at FIGS. 4, 6, 8 and 10, each of the second cavities 414 includes a resilient second lock arm 446. Each second lock arm 446 is disposed into a respective second cavity 414 and resiliently engages a lock ring 448 of the second ferrule 416 received therein so as to abuttably prevent the second ferrule from backing out from the second cavity. A secondary abutment 445 in each second cavity 414 abuts the lock ring 448 so as to prevent the second ferrule from further advancing in the second cavity (see FIG. 10).

Figure 4:
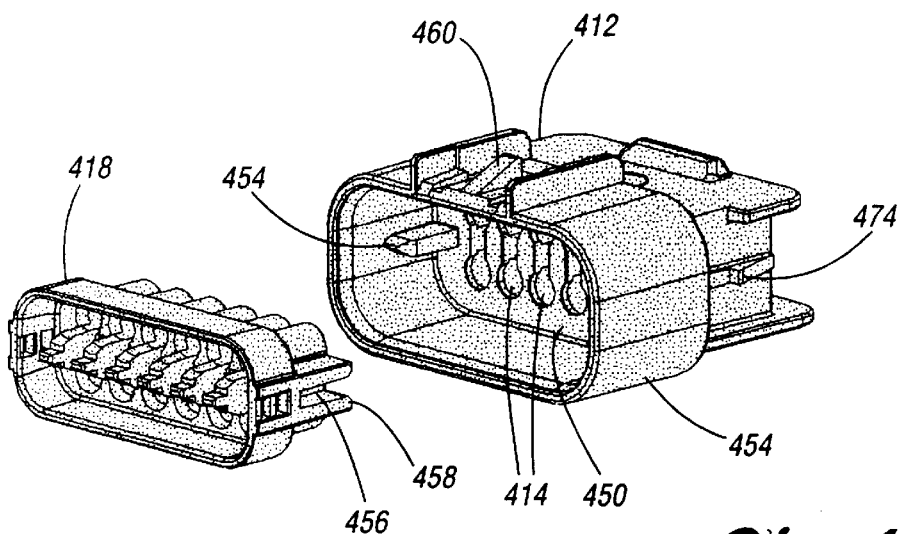
FIG. 4 is a perspective view of a second coupling member and an alignment body according to the present invention.
Figure 6:
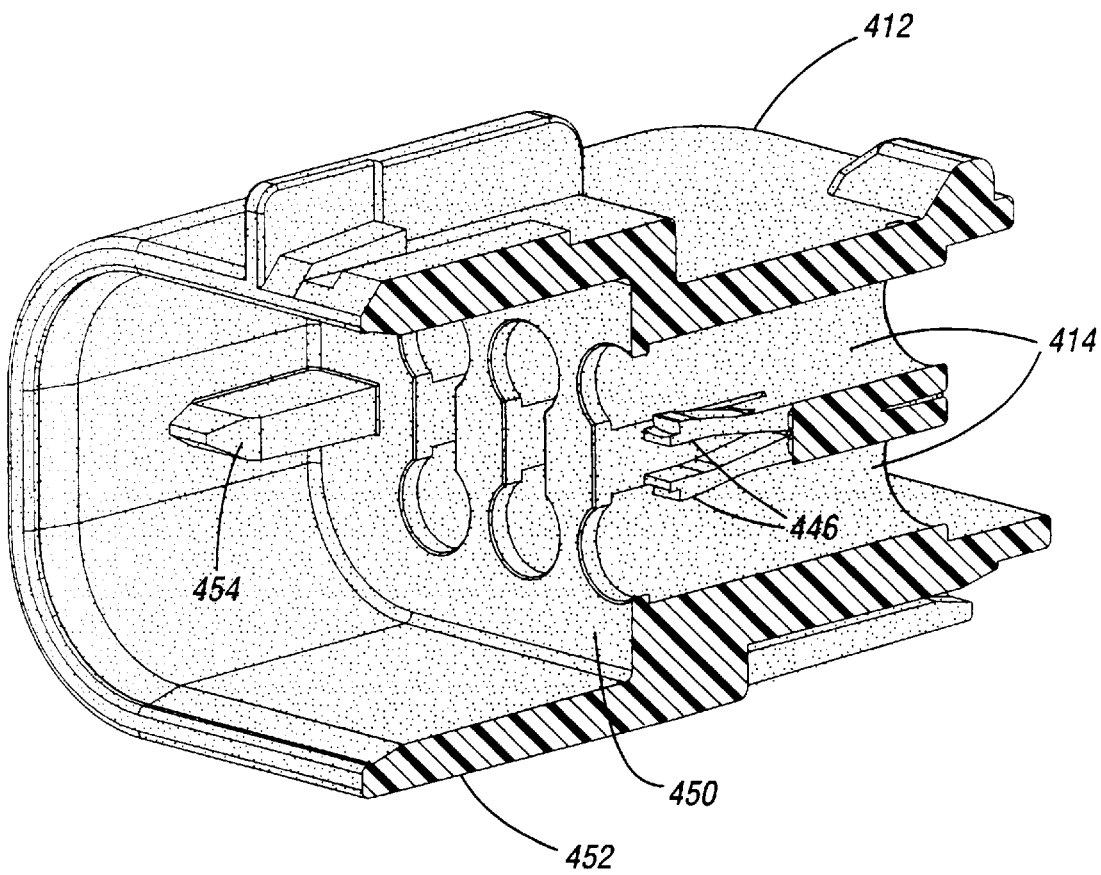
FIG. 6 is a partly sectional perspective view of the second coupling member according to the present invention.

As shown best at FIGS. 4 and 6, the inner surface 450 of the second coupling member 412 is recessed with respect to a second shroud 452. A pair of axially oriented alignment rails 454 project from the inner surface 450 for guidably interfacing with corresponding alignment slots 456 of the alignment body 418 which communicate with a second side 458 of the alignment body.

A ramped boss 460 mounted to the second shroud 452 is structured to lock with respect to the main lock arm 440. As best shown at FIG. 10, a two-stage lock assurance member 462 is inserted into the first shroud 438, wherein the first stage retains it thereto, and the second stage prevents the bossed head 440a from pivoting away from the ramped boss 460 when the first and second coupling members are fully mated.

Referring now to the second FPA member 426, shown best at FIGS. 3 and 10, a plurality of lead slots 464 are defined on either side by retainer tabs 466. The retainer tabs 466 are dimensioned to compressibly abut cylindrical elastomeric or coil springs 465 (wherein elastomeric springs may serve a sealing function) located at the end of the second ferrules 416 (see FIG. 10). A stabilizer rib 468 is provided as a stiffener. On each side of the stabilizer rib 468 is a flexible leg 470. Each leg 470 has a slot 472 for receiving a ramped lip 474 located on each side of the second coupling member 412. In this regard, a pair of mutually opposed ledges 476 are provided on the second coupling member, opposite the second shroud 452, for guiding the second FPA 426 during assembly.

As indicated at FIG. 3, opposite the first shroud 438, the first coupling member 406 has ramped lips and mutually opposed ledges similar to the ramped lip 474 and mutually opposed ledges 476 of the second coupling member 412. These structures of the first coupling member 406 are provided, in similar function to those of the second coupling member, for an optional ferrule position assurance member (not shown) to be located thereat which may further provide a sealing function.

In operation of the coupling assembly 400, the first side 432 of the alignment body 418 is brought toward the inner surface 436 of the first coupling member 406 and locked thereto at a first stage by the two-stage clip member 435. The first ferrules 410 are then received into individually respective first cavities 408 of the first coupling member and mating cavities 420 of the alignment body so that the first lock arms 428 engage the lock rims 430 thereof. The alignment body is then locked to the first coupling member at a second stage by the two-stage clip member, whereupon the PLR fingers 434 lock the first lock arms in place.

The second ferrules 416 are received into individually respective second cavities 414 of the second coupling member 412 so that the second lock arms 446 engage the lock rings 448 thereof, whereupon the lock rings become trapped between the lock arms and the secondary abutments 445. The lead slots 464 of the second FPA member 426 receives each respective POF lead and is lockably affixed, via the legs 470 locking to the ramped lip 474, to the rear of the second coupling member. In this regard, the cylindrical spring 465 associated with each second ferrule is compressed with respect to the secondary abutment 445.

Next, the first and second coupling members are locked together, whereby the second shroud 452 is received by the first shroud 438 in a male-female type interaction. During this step, the second ferrules enter into respective mating cavities 420, aided by chamfers 420a (see FIG. 9), so that each first ferrule is aligned with a respective second ferrule and the cylindrical springs 465 bias the POF upstream faces into aligned abutment with individually respective GOF downstream faces.

To those skilled in the art to which this invention appertains, the above described preferred embodiments may be subject to change or modification. Such change or modification can be carried out without departing from the scope of the invention, which is intended to be limited only by the scope of the appended claims.

What is claimed is:

1. A coupling assembly for connecting a plurality of glass optical fibers to a plurality of plastic optical fibers, wherein each glass optic fiber has a first ferrule and each plastic optical fiber has a second ferrule, and wherein said coupling assembly optically interfaces each glass optical fiber to a respective plastic optic fiber, said coupling assembly comprising:

a first coupling member having a plurality of first cavities, said first coupling member having first abutment means at each first cavity for providing an abutment resiliently disposed therein;

a second coupling member having a plurality of second cavities, said second coupling member having second abutment means at each second cavity for providing an abutment resiliently disposed therein;

means for lockably connecting said first and second coupling members together, wherein each first cavity is aligned with a respective second cavity, each aligned first and second cavity forming a cavity pair; and an alignment body disposed between said first and second coupling members, said alignment body having a plurality of mating cavities, wherein each mating cavity is aligned with a respective cavity pair.

2. A coupling assembly, comprising:

a plurality of first ferrules, each first ferrule having a first abutment;

a plurality of second ferrules, each second ferrule having a second abutment;

a first coupling member having a plurality of first cavities for receiving respectively therein a first ferrule of said plurality of first ferrules, said first coupling member having first lock arm means at each first cavity for resiliently engaging said first abutment;

a second coupling member having a plurality of second cavities for receiving respectively therein a second ferrule of said plurality of second ferrules, said second coupling member having second lock arm means at each second cavity for resiliently engaging said second abutment;

means for lockably connecting said first and second coupling members together, wherein each first cavity is aligned with a respective second cavity, each aligned first and second cavity forming a cavity pair;

an alignment body disposed between said first and second coupling members, said alignment body having a plurality of mating cavities for receiving a respective first and second ferrule of said plurality of first and second ferrules, wherein each mating cavity is aligned with a respective cavity pair; and biasing means for biasing each first ferrule into an aligned abutment with an individually respective second ferrule.

3. The coupling assembly of claim 2, wherein said biasing means comprises:

a ferrule position assurance member comprising a plurality of retainer tabs and pair of legs;

engagement means for connecting said pair of legs to said second coupling member; and spring means connected to each second ferrule for providing resiliency;

wherein when said pair of legs are engaged with said second coupling member, said plurality of retainer tabs resiliently compress said spring means to thereby bias said plurality of second ferrules into abutment with said plurality of first ferrules.

4. The coupling assembly of claim 3, wherein said alignment body further comprises positive lock reinforcement fingers for retaining said first lock arm means engaged with respect to each said first abutment.

5. The coupling assembly of claim 4, wherein said first abutment comprises a rim connected with each first ferrule; and wherein said second abutment comprises a ring connected with each second ferrule.

6. The coupling assembly of claim 5, further comprising secondary abutment means at each second cavity for trapping a respectively received second ferrule between said secondary abutment means and said second lock arm means thereof.

7. The coupling assembly of claim 6, further comprising two-stage means for connecting said alignment body to said first coupling member, wherein at a first stage of connection said alignment body is connected to said first coupling member, and upon reaching a second stage of connection said positive lock reinforcement fingers retain said first lock arm means engaged with respect to each said first abutment.

8. The coupling assembly of claim 7, wherein said first coupling member further comprises a first shroud; and wherein said second coupling member further comprises a second shroud, said first shroud receiving said second shroud when said first and second coupling members are lockingly connected.

9. The coupling assembly of claim 8, further comprising alignment means for aligning said alignment body with respect to said first and second coupling members.

10. The coupling assembly of claim 9, further comprising two-stage engagement means for connecting said alignment body to said first coupling member.

11. A fiber optic coupling assembly, comprising:

a plurality of glass optical fiber leads, wherein each glass optical fiber lead thereof has a glass optical fiber downstream end;

a plurality of plastic optical fiber leads, wherein each plastic optical fiber lead thereof has a plastic optical fiber upstream end;

a plurality of first ferrules, each first ferrule thereof having a first abutment, each glass optical fiber lead being received by a respective first ferrule;

a plurality of second ferrules, each second ferrule thereof having a second abutment, each plastic optical fiber lead being received by a respective second ferrule;

a first coupling member having a plurality of first cavities for receiving respectively therein a first ferrule of said plurality of first ferrules, said first coupling member having first lock arm means at each first cavity for resiliently engaging said first abutment;

a second coupling member having a plurality of second cavities for receiving respectively therein a second ferrule of said plurality of second ferrules, said second coupling member having second lock arm means at each second cavity for resiliently engaging said second abutment;

means for lockably connecting said first and second coupling members together, wherein each first cavity is aligned with a respective second cavity, each aligned first and second cavity forming a cavity pair;

an alignment body disposed between said first and second coupling members, said alignment body having a plurality of mating cavities for receiving a respective first and second ferrule of said plurality of first and second ferrules, wherein each mating cavity is aligned with a respective cavity pair; and biasing means for biasing each first ferrule into an aligned abutment with an individually respective second ferrule so that each glass optical fiber downstream face is optically interfaced with a respective plastic optical fiber upstream face.

12. The coupling assembly of claim 11, wherein said biasing means comprises:

a ferrule position assurance member comprising a plurality of retainer tabs and pair of legs;

engagement means for connecting said pair of legs to said second coupling member; and spring means connected to each second ferrule for providing resiliency;

wherein when said pair of legs are engaged with said second coupling member, said plurality of retainer tabs resiliently compress said spring means to thereby bias said plurality of second ferrules into abutment with said plurality of first ferrules.

13. The coupling assembly of claim 12, wherein said alignment body further comprises positive lock reinforcement fingers for retaining said first lock arm means engaged with respect to each said first abutment.

14. The coupling assembly of claim 13, wherein said first abutment comprises a rim connected with each first ferrule; and wherein said second abutment comprises a ring connected with each second ferrule.

15. The coupling assembly of claim 14, further comprising secondary abutment means at each second cavity for trapping a respectively received second ferrule between said secondary abutment means and said second lock arm means thereof.

16. The coupling assembly of claim 15, further comprising two-stage means for connecting said alignment body to said first coupling member, wherein at a first stage of connection said alignment body is connected to said first coupling member, and upon reaching a second stage of connection said positive lock reinforcement fingers retain said first lock arm means engaged with respect to each said first abutment.

17. The coupling assembly of claim 16, wherein said first coupling member further comprises a first shroud; and wherein said second coupling member further comprises a second shroud, said first shroud receiving said second shroud when said first and second coupling members are lockingly connected.

18. The coupling assembly of claim 17, further comprising alignment means for aligning said alignment body with respect to said first and second coupling members.

19. The coupling assembly of claim 18, further comprising two-stage engagement means for connecting said alignment body to said first coupling member.

* * * * *